J. H. PIERSON.

Making Wood Screws.

No. 109.

Reissued March 8, 1848.

H. PETERS, Photo-Lithographer, Washington, D. C.

UNITED STATES PATENT OFFICE.

HENRY L. PIERSON, OF RAMAPO, NEW YORK, ASSIGNEE OF J. H. PIERSON, OF SAME PLACE.

IMPROVEMENT IN MACHINES FOR NICKING OR CUTTING NOTCHES IN THE HEADS OF WOOD-SCREWS.

Specification forming part of Letters Patent No. 92, dated November 24, 1836; Reissue No. 109, dated March 8, 1848.

*To all whom it may concern:*

Be it known that JEREMIAH H. PIERSON, of Ramapo, in the county of Rockland and State of New York, has invented a new and useful Machine for Nicking or Cutting the Notches in the Heads of Wood-Screws; and I, HENRY L. PIERSON, his assignee, do hereby declare that the following is a full and exact description thereof, reference being had to the accompanying drawings.

Figure 1:
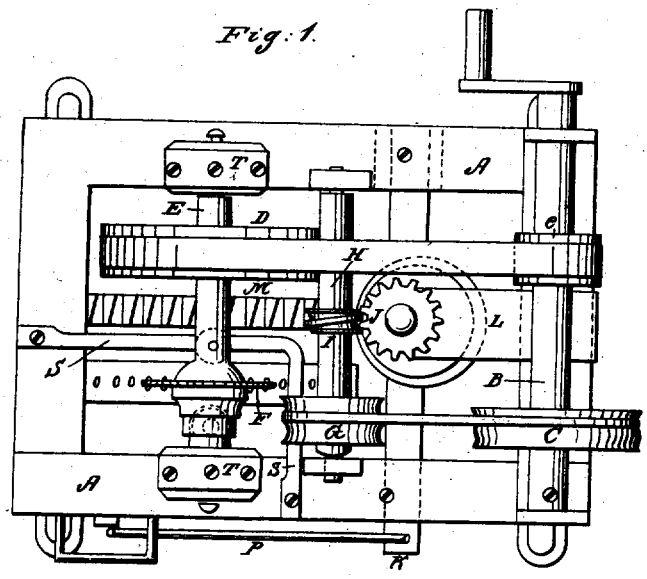
Figure 2:
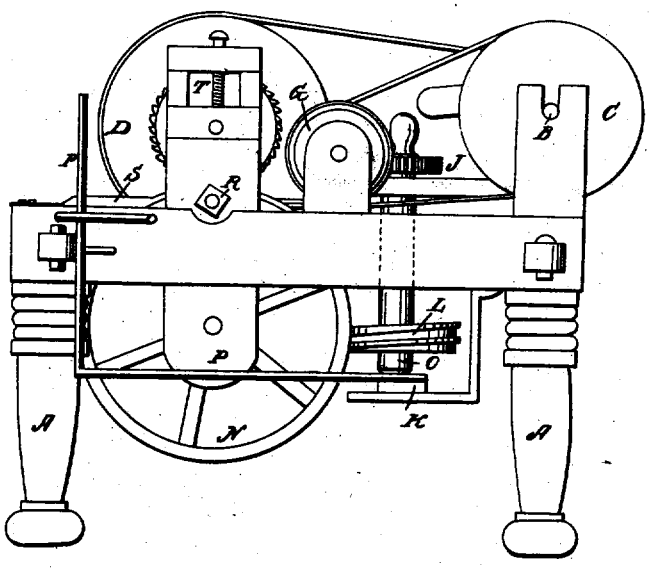

Figure 1 is a plan or top view of the machine, and Fig. 2 an elevation on one side, these two views showing all the essential parts of the machine, and the corresponding parts of each being designated by similar letters of reference.

In this machine the blanks or screws to be nicked are fed or placed in holes made radially in the periphery of a carrying-wheel composed of two plates, the holes being made at the junction of the two plates, and by the rotation of this wheel they are carried up to and passed under a cutter that forms the nick, they are gripped and held tight during that operation, and then by the further rotation of the wheel are liberated and discharged; and the nature of my invention consists in gripping the blanks in recesses made radially in the face of a wheel by making pressure on one or both sides as the wheel rotates, so that the blanks may be dropped into the holes or recesses with their heads outward and gripped while passing under the nicking-cutter, and then by the further rotation of the wheel liberated that they may be discharged.

In the accompanying drawings, A A is the frame-work of the machine.

B is a shaft to which the driving-power is applied, upon which there are two pulleys, C C, with bands for driving the different parts of the machinery.

D is a whirl on the shaft E, which carries the circular cutter F, by which the screws are to be nicked. A band from the whirl C drives the whirl G on the shaft H, upon which there is an endless screw or worm, I, which takes into a pinion, J, upon the upper end of a vertical shaft, the lower end of which runs in a bridge-tree or shifting-bar, the end of which is shown at K, Fig. 2. This shaft carries an endless screw or worm, L, which takes into and drives the toothed wheel M, Fig. 1, which toothed wheel is on the same shaft with that of N for holding the blanks, the lower end, O, of the vertical shaft being seen in Fig. 2, the connecting-rod P acting upon the bridge-tree or shifting-bar K. The blank-wheel N is in two parts, divided through its plane, as shown by the line along its periphery. One of these parts is fixed firmly on its axle, while the other part slides upon a square eye, or otherwise upon the axle, and is capable, therefore, of receding from the fixed part, although it revolves with it. The periphery of this wheel is perforated with holes at the junction of its two parts, as shown in the drawings, which holes are of such size as to receive and hold the blanks which are to be nicked. To cause the two portions of this wheel to grip the blank while it is being nicked, there is a friction-roller which bears against the outer edge of the periphery of the movable part immediately under the circular cutter. The dotted line Q, Fig. 1, marks its situation, which is opposite to the screw-nut R, Fig. 2, which confines the friction-wheel box in its place. To react against this friction-roller a similar one is placed opposite to it, and bears upon the fixed portion of the blank-wheel. The bar S is to sustain this friction-wheel. The shaft which carries the saw is raised or lowered by means of the adjusting-screws T T, and by this means the depth of the nick is perfectly regulated.

Having thus fully described the construction of said machine, its operation will be readily understood.

The shaft B, being made to revolve by any motive power, the blanks are dropped into the holes in the blank-wheel N as it approaches the cutter, and are held firmly while being cut by the pressure of the friction-rollers, and being released from this pressure, they fall out by their own gravity as they are carried round to the lower part of the machine.

It will be obvious from the foregoing that instead of having one part of the wheel firmly attached to the shaft both parts may be loose thereon, provided they are so connected with it as to be carried around by its rotation, and admit of being pressed together to grip the blanks firmly while passing under the operation of the cutter to be nicked, whether this cutter be a rotating cutter or any other kind of instrument for this purpose, although the rotating cutter is deemed to be the best.

Instead of the rollers to press together, the two parts of the carrying-wheel cheeks may be substituted, but with less advantage, on account of the friction of the rubbing surfaces, and instead of making use of two rollers, the one that bears against the face of the permanent part of the wheel may be dispensed with by making this part of the wheel very strong, and the shaft to run in firm bearings that will afford sufficient strength to resist the pressure required to grip the blanks firmly while being nicked.

It will also be obvious that the two parts of the wheel may be kept apart for the free reception and delivery of the blanks either by a boss or shoulder on the shaft or by the introduction of something between them, or by any other equivalent means, although a projection boss or shoulder on the shaft is the simplest and most effective.

What I claim as the invention of the said JEREMIAH H. PIERSON, and desire to secure by Letters Patent, is—

1. The method, substantially as described, of presenting the blanks to the nicking-tool or cutter by gripping them in the radial recesses of a wheel as it rotates to present them to the action of the tool to be nicked, so that as the wheel rotates the blanks may be easily inserted in the holes or recesses with their heads outward, gripped as they pass to and under the operation of the nicking-tool, and then by the further rotation of the wheel liberated and discharged, as herein described.

2. The carrying and gripping wheel operating on the principle herein described, in combination with the rotating cutter for nicking the heads, as described.

HENRY L. PIERSON.

Witnesses:
E. F. HOPKINS,
GEORGE L. NICHOLS.